United States Patent
Hamill et al.

[19]

[11] Patent Number: 6,085,513

[45] Date of Patent: Jul. 11, 2000

[54] METHOD AND APPARATUS FOR BYPASSING THE SUPERHEATER IN A DUAL FLUID ENGINE

[75] Inventors: James J. Hamill; Michael C. Ryan, both of San Jose; Richard A. Bitting, Redwood City, all of Calif.

[73] Assignee: International Power Technology, Foster City, Calif.

[21] Appl. No.: 08/784,323

[22] Filed: Jan. 16, 1997

Related U.S. Application Data

[60] Provisional application No. 60/010,122, Jan. 17, 1996.

[51] Int. Cl.⁷ ....................................................... F02C 3/30
[52] U.S. Cl. ......................................... 60/39.05; 60/39.55
[58] Field of Search .............................. 60/39.05, 39.182, 60/39.55

[56] References Cited

U.S. PATENT DOCUMENTS 4,685,288  8/1987  Cheng .................................... 60/39.55
5,170,622  12/1992  Cheng .................................... 60/39.55

*Primary Examiner*—Louis J. Casaregola
*Attorney, Agent, or Firm*—J. William Wigert, Jr.; Crosby, Heafey, Roach & May

[57] ABSTRACT

An improved configuration for dual fluid steam injected power generators incorporates means to bypass the steam generated by the heat recovery steam generator (HRSG) around the superheater. The bypass allows for variation in the amount of superheat added to the injection steam used by the gas turbine. In an alternative configuration, the bypass means is placed between the turbine gas outlet and the superheater gas inlet. The bypass allows the hot turbine exhaust gases to be switched between the HRSG gas inlet and the superheater gas inlet. Finally, a method for controlling the power output and amount of steam generated by a steam injected power generator is described.

10 Claims, 2 Drawing Sheets

METHOD AND APPARATUS FOR BYPASSING THE SUPERHEATER IN A DUAL FLUID ENGINE

This application claims the benefit of U.S. Provisional application No. 60/010,122, filed Jan. 17, 1996; titled "Superheater Bypass"; inventors James J. Hamill, Michael C. Ryan and Richard A. Bitting.

TECHNICAL FIELD

This invention relates generally to an improved design for engines and steam cogeneration, particularly steam injected gas turbines, such as dual fluid engines.

BACKGROUND OF THE INVENTION

The dual fluid heat (e.g. Cheng cycle) engine has been described in U.S. Pat. Nos. 3,978,661, 4,128,994 and 4,248,039. Parameter optimization and control paths for the dual fluid heat engine are described in U.S. Pat. Nos. 4,297,841, 4,417,438 and 4,393,649. This invention relates to an improved design for, and improved procedures for operating, dual fluid heat engines utilizing the Cheng cycle as well as conventional systems, and other dual fluid systems.

OPERATION OF DUAL FLUID BOILER SYSTEMS

Steam injected gas turbines which use heat recovery for steam generation are inherently flexible cogeneration systems. Properly designed systems can use steam to supplement the gases which drive the turbine. A typical configuration includes a gas turbine, a steam superheater and a heat recovery steam generator (HRSG). The hot exhaust gases from the turbine are ducted to the superheater and the HRSG. The HRSG consists of an evaporator and an economizer and may also have a supplementary burner for additional steam generation.

As noted above, the system has four major components: the gas turbine; the economizer; the evaporator and the superheater. Normally, located between, and connected to, the evaporator and the superheater is a water storage drum. During operation, the turbine exhaust gases are vented to the superheater and the HRSG, both of which rise in temperature. Water from the water storage drum is circulated through the heat exchanger tubes in the evaporator section and returned to the drum. As steam is produced by the HRSG, the steam is removed from the vapor space in the water storage drum and passed on to the superheater section and then into the turbine.

For a given engine firing temperature, a given amount of steam injection increases the power output of the turbine. The degree to which the power generating efficiency of the gas turbine is improved by steam injection is directly related to the temperature of the steam. The maximum possible temperature of the steam provided by the superheater is near that of the turbine exhaust gases. The minimum possible temperature of the steam is equal to the saturation temperature of the HRSG.

For a given power output, when injection steam is used in conjunction with combustion to drive the turbine, cooler steam requires more fuel to be burned to drive the turbine than does hotter steam. Because hotter steam requires less fuel to be burned, the efficiency of power generation using hotter steam is enhanced relative to that achieved when using cooler steam. The interposition of the superheater between the HRSG and the turbine affords improved power generating efficiency by increasing the heat of the steam delivered to the turbine to a temperature near that of the turbine exhaust gases. However, the superheater draws heat away from the HSRG and consequently reduces the heat available for total steam generation. Thus, for a given energy input, when the superheater is on-line the amount of steam generated by the HRSG is less than when the superheater is off-line.

If it is desired to produce non-superheated steam for use in power generation or thermal processes other than power generation, the delivery of process steam to its consumers can be maximized by shunting the process steam produced by the HRSG around the superheater. Bypassing the process steam around the superheater maximizes the total heat available to the HRSG and thus, the total heat available for steam generation. Similar results may be obtained by shunting the turbine exhaust gases around the superheater and directly into the HRSG.

The improvement in boiler design and operating procedures which is the subject of this invention begins with the recognition that operating flexibility can be enhanced by varying the amount of heat recovery from the gas turbine used to superheat injection steam.

It is therefore an object of this invention to provide a new and improved design for a boiler which includes a means to bypass the superheater so that low temperature steam, rather than superheated steam, is injected into the combustion chamber.

It is a further object of this invention to bypass the turbine exhaust gases around the superheater and deliver them directly to the HRSG.

It is also an object of this improved design to permit the temperature of superheated steam delivered to the gas turbine to be varied.

It is a further object of this invention to provide a method to vary the amount of heat recovery from the gas turbine exhaust used to superheat the steam injected into the gas turbine.

It is yet a further object of this method and improved design to alleviate the problems caused by limited supplementary burner turndown.

It is still a further object of this method and design to control the maximum steam temperature to the engine to avoid problems with material temperature limits.

It is a further objective of this method and improved design to compensate for design or construction variations in the heat transfer characteristics of plant equipment.

Yet another objective of this method and design is to eliminate the need for dumping excess steam or reducing power to decrease the amount of steam production when very little steam is needed by the process.

SUMMARY OF THE INVENTION

In a steam injected gas turbine whether using the Cheng cycle or otherwise, with a superheater and an HRSG, bypassing a portion of the steam injected into the turbine around the superheater allows temperature and the amount of superheated steam injected into the gas turbine to be controlled, depending on system demands for power versus process steam. A similar result may be had by bypassing the turbine exhaust gases around the superheater and directly into the HRSG. The present invention is generally directed to either of these configurations.

At one extreme, when the bypass is open, all of the steam is bypassed around the superheater and the injection steam is provided directly into the turbine at the saturation temperature of the HRSG. This operating mode maximizes the heat available to the HRSG and thus, the amount of steam produced by the HRSG. At the opposite extreme, when the bypass is closed, all of the steam is superheated prior to its being injected into the turbine and the steam temperature approaches the temperature of the turbine exhaust gases and the system approaches maximum power generating efficiency.

Between the two extremes there exists a spectrum of intermediate conditions which may be accessed by adjusting the bypass. Any one or more of these intermediate conditions may be useful for balancing the need to generate a desired quantity of process steam with the power generation requirements for the system. In addition, any one or more of these intermediate conditions may be useful in achieving some or all of the objects of the invention stated above.

In one embodiment, a bypass in the steam line is provided such that all, or a portion of, the steam is shunted around the superheater and delivered directly into the combustion chamber.

In another embodiment, a bypass in the turbine gas exhaust line such that all, or a portion of, the turbine exhaust gases are shunted around the superheater and delivered into the HRSG.

In an additional embodiment, the invention is a method for controlling a superheater bypass which comprises the steps of evaluating the total steam demand of the plant and adjusting the bypass means to regulate the heat available to the HRSG while maintaining a desired degree of superheat in the injection steam. This controlling is part of the total steam produced.

In another embodiment, the invention is a method for controlling the superheater bypass which comprises the steps of evaluating temperature limitations caused by material properties and adjusting the bypass means to maintain a desired degree of superheat temperature in the injection steam.

In another embodiment, the invention is a method for controlling a superheater bypass comprising the steps of evaluating the effects of design or construction variations in heat transfer characteristics and adjusting the bypass means to compensate such variations by altering the relative heat transfer in the superheater and evaporator sections of the HRSG.

In an additional embodiment, the invention is a method for alleviating problems caused by limited supplementary burner turndown comprising the steps of identifying operating conditions which require burner operation at less than the turndown limit and, adjusting the bypass means so as to regulate the total steam production, thus alleviating the need to operate the burner a less than the turndown limit.

DESCRIPTION OF THE PREFERRED EMBODIMENTS

Figure 1:
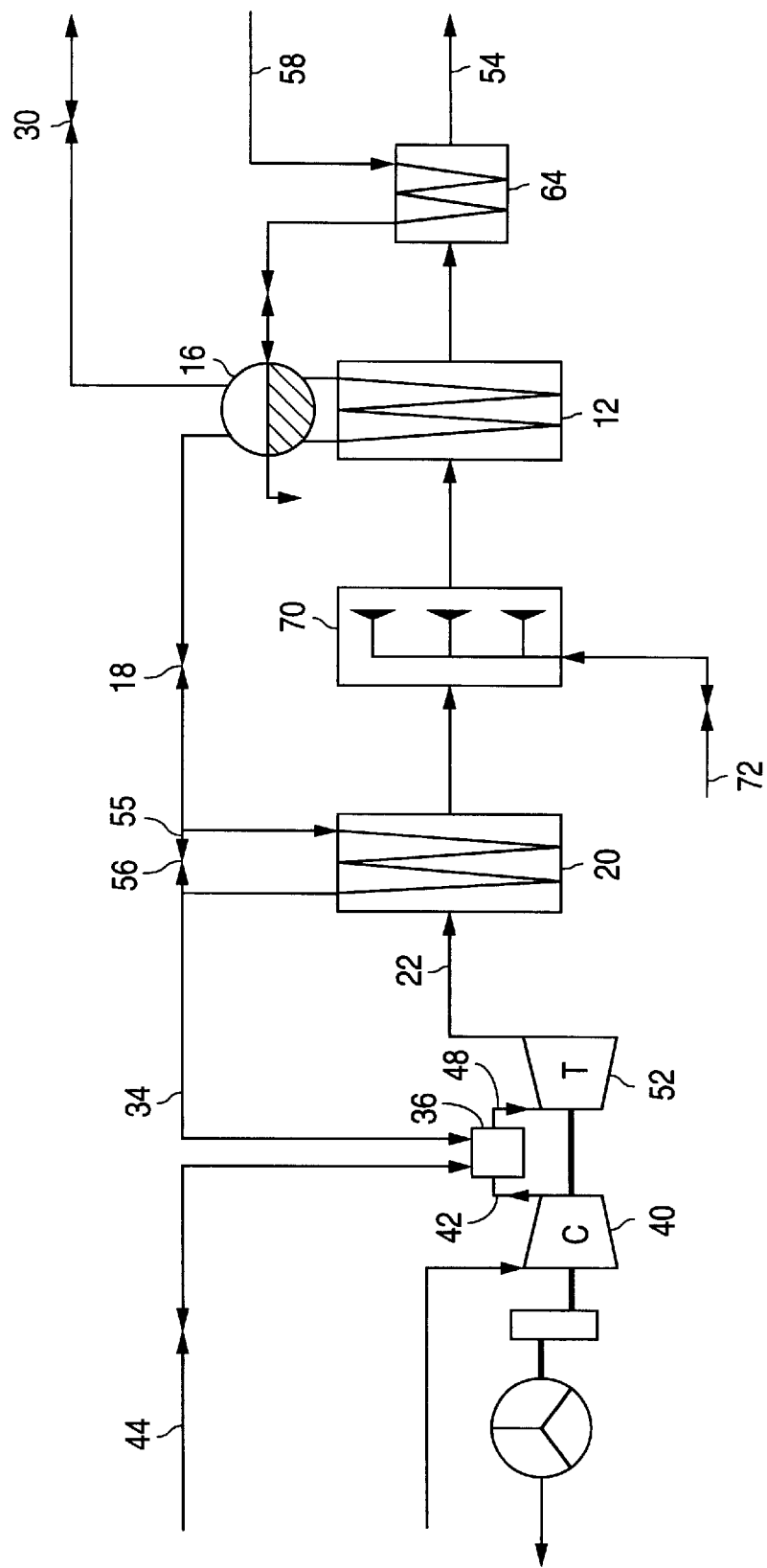
FIG. 1 is a block diagram of a dual fluid cycle steam/power generator in which the bypass around the superheater is positioned in the steam line.

In the following discussion, a typical dual fluid system incorporating a superheater bypass is described. It is understood that the scope of the present invention encompasses other types of dual fluid power systems.

A gas turbine engine including of a compressor 40 a combustor 36 and a turbine 52 is connected to a heat recovery steam generator (HRSG) consisting of a superheater 20 an evaporator 12 and optionally a water pre-heater 64 and a supplementary burner 70. Fuel 44 is introduced into the gas turbine engine combustor 36 where it is combusted using air from the compressor 42. Steam 34 is also introduced into the combustor for the purpose of power augmentation, emissions control and/or efficiency improvement. The mixed fluid from the combuster 48 is expanded through the turbine section 52. The exhaust gas 22 passes through a superheater 20 where some of the heat from the exhaust gas is given to the turbine injection steam 34.

From the superheater, exhaust gas may receive additional heat input from supplementary burner 70.

Exhaust gases pass through the evaporator 12 where heat is used to boil water. A water storage vessel 16 connected to the evaporator allows for the extraction of steam for either steam injection to the gas turbine engine or to a process steam line 30 for other steam uses.

The water supply to the water storage vessel 58 passes through a pre-heater 64 which allows for further heat extraction from the exhaust gases before they are vented 54.

The amount of steam injected to the gas turbine engine is controlled by a valve 18. The amount of steam injected to the engine determines the power augmentation of the engine. The efficiency of the power generating cycle is determined by the amount of heat extracted from the exhaust gases by the injection steam. The amount of steam produced by the HRSG (without the addition of a supplementary burner) is determined by the heat content and capacity of the incoming exhaust gases. The heat content and capacity of the exhaust gases is determined by the firing rate of the gas turbine as well as the amount of steam injection, and the heat removed by the injection steam in the superheater.

The improved boiler design which is the subject of this invention introduces a bypass to bypass the steam coming into the combustion chamber 36 around the superheater 20. In FIG. 1 this takes the form of a line 55 and valve 56. Once steam begins to flow out of the water storage drum 16 through the steam injector control valve 18, it can be entirely or only partially shunted around the superheater 20 and to the combustion chamber 36 through the steam injection line 34. Once steam flow begins in the steam injection line 34, optimum engine performance can be regulated, in part, by adjusting the trim on the bypass valve 56. Alternatively, the bypass may be switched either completely on or completely off.

Additional process steam may be generated by use of a supplemental burner 70 interposed between superheater 20 and evaporator 12. Burner fuel is provided to supplemental burner 70 through line 72 and augmenting air through line 74.

It is not essential that the bypass be positioned in the steam injection line 34. In an alternative embodiment the bypass is provided in the turbine exhaust line 22. This second embodiment is displayed in FIG. 2, where the components of the steam power generator are numbered identically to corresponding components in FIG. 1.

Figure 2:
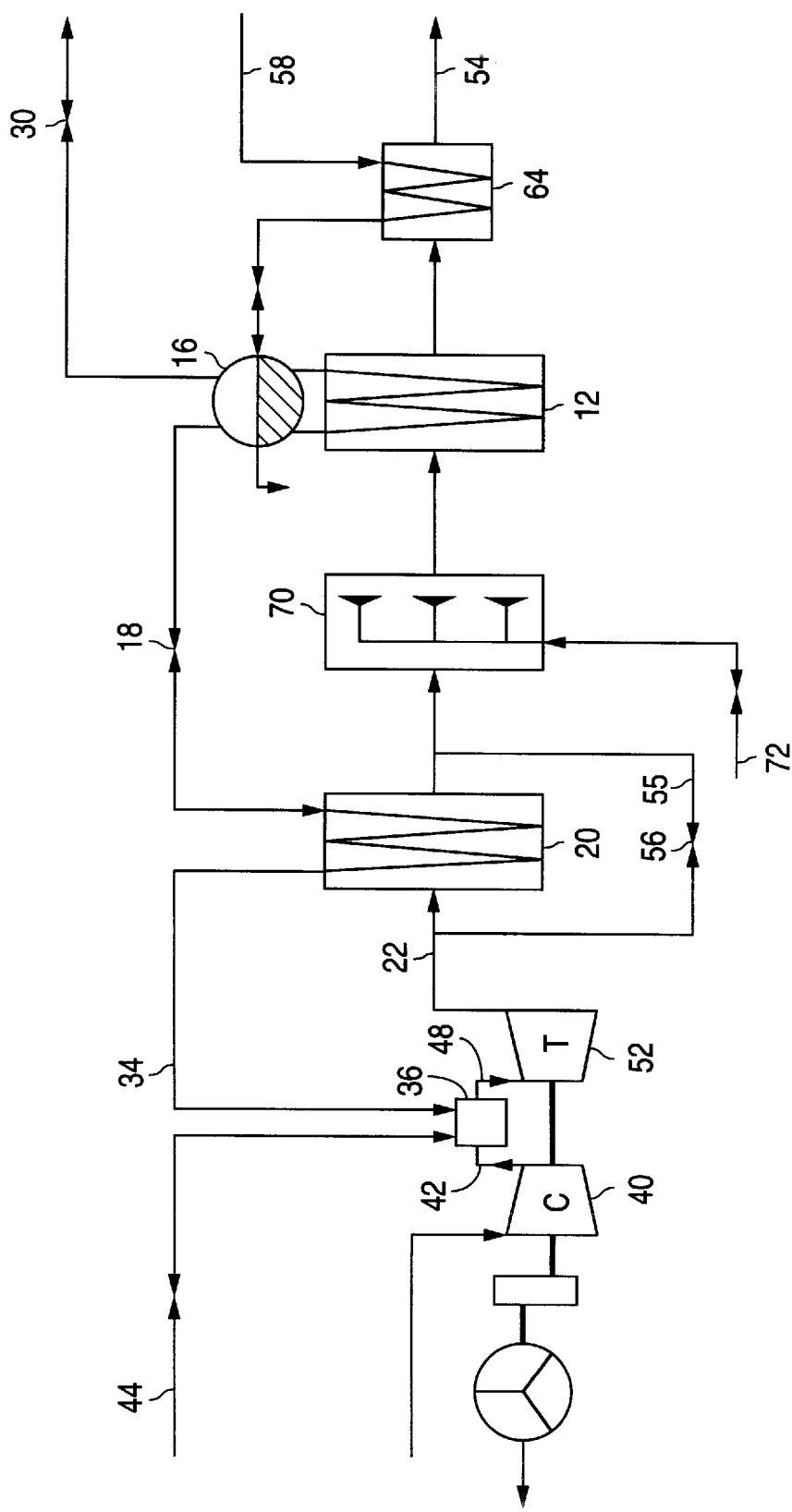
FIG. 2 is a block diagram of another embodiment of the modified dual fluid steam/power generator in which the bypass around the superheater is positioned in the turbine gas exhaust line.

The operation of the embodiment displayed in FIG. 2 differs from that displayed in FIG. 1 in that the steam flowing through the steam injection line 34 passes through the superheater section 20 prior to entering the combustion chamber 36. However, in contrast to the first described embodiment, the temperature of the superheater section 20, and thus the temperature of the injection steam, is controlled by altering the trim on bypass 56' which is located in the turbine exhaust gas line 22.

Thus, the bypass is controlled in order to optimize the operation of the steam/power generator and to achieve the objectives of the invention. The total steam output required from the generator for carrying out thermal or other processes is determined. The total required power output is also determined. The bypass valve regulates the heat available to the HRSG, and the heat available to the superheater, thus regulating the amount of steam generated and the amount of power generated by the plant.

Clearly, other modifications and variations of the present invention are possible in light of the above teachings. It is therefore to be understood that changes may be made in the particular embodiments described herein which are within the scope of the appended claims.

We claim:

1. A dual fluid cycle power/steam generator including a compressor, a combustion chamber, a gas turbine driven by combustion gases and steam from the combustion chamber and from which exhaust gas exits, a steam injection system for injecting steam within the combustion chamber, and wherein the steam injection system comprises:
    a superheater for injecting super heated steam, heated therein by the exhaust gases and steam which exits from the gas turbine, within the combustion chamber and wherein lower energy exhaust gases exit from the superheater;
    heat recovery means for using the lower energy exhaust gases from the superheater, to heat water into lower temperature process steam, and to provide lower temperature steam to the superheater; and
    alternate means for regulating the amount of heating of the low temperature steam by the superheater in a range from a minimum of no heating to a maximum amount of heating.

2. A dual fluid cycle engine as in claim 1 wherein the alternate means comprises a bypass line which goes directly from the heat recovery means to the combustion chamber, and means for altering the flow of lower temperature steam from the superheater to the combustion chamber.

3. A dual fluid cycle engine as in claim 2 wherein the altering means comprises a valve.

4. A dual fluid cycle engine as in claim 3 wherein the altering means controls the relative amount of steam which flows through the superheater and directly to the combustion chamber.

5. A dual fluid cycle engine as in claim 1, 2, 3 or 4 including a supplemental burner for further heating steam passing from the superheater to the heat recovery system.

6. A dual fluid cycle engine as in claim 1 wherein the alternate means comprises a line for diverting exhaust gases exiting the turbine from the superheater to the heat recovery means.

7. A dual fluid cycle engine as in claim 6 wherein the alternate means further includes a valve for variably diverting exhaust gases from the superheater directly to the heat recovery means.

8. A dual fluid cycle engine as in claim 6 including a supplemental burner for further heating steam passing from the superheater to the heat recovery system.

9. A steam power generator comprising:
    a compressor;
    a combustion chamber for receiving compressed air from the compressor and for receiving fuel and having a steam inlet and gas outlet;
    a gas turbine having an inlet connected to the combustion chamber gas outlet and having an exhaust outlet;
    a superheater having a input connected to the gas turbine exhaust outlet and having a gas output and also having an outlet, a steam inlet and a steam outlet, the steam outlet connected to the combustion chamber steam inlet;
    a heat recovery steam generator (HRSG) for receiving gas from the superheater gas output for heating water into steam; and
    alternate means for regulating the amount of heating of the low temperature steam by the superheater by distributing steam from the HRSG to either the superheater steam inlet or to the combustion chamber steam inlet.

10. In a dual fluid cycle power/steam generator including a compressor, a combustion chamber, a gas turbine driven by combustion gases and steam from the combustion chamber and from which exhaust gas exits, and a superheater, a method of injecting steam within the combustion chamber comprises:
    injecting super heated steam heated by the exhaust gases and steam which exits from the gas turbine within the combustion chamber;
    using lower energy exhaust gases from the superheater to heat water into low temperature process steam and to provide low temperature steam to the superheater; and
    means for regulating the amount of heating of the low temperature steam by the superheater by providing the low temperature steam from the heat recovery means directly into the combustion chamber by bypassing the superheater.

* * * * *